(12) United States Patent
Parkinson

(10) Patent No.: US 8,029,048 B2
(45) Date of Patent: Oct. 4, 2011

(54) RIGIDITY OF VEHICLE BODY PANELS

(75) Inventor: Tim Parkinson, Olney (GB)

(73) Assignee: Nissan Motor Manufacturing (UK) Ltd., Bedfordshire (GB)

( * ) Notice: Subject to any disclaimer, the term of this patent is extended or adjusted under 35 U.S.C. 154(b) by 1045 days.

(21) Appl. No.: 11/797,404

(22) Filed: May 3, 2007

(65) Prior Publication Data

US 2007/0259556 A1 Nov. 8, 2007

(30) Foreign Application Priority Data

May 5, 2006 (GB) .................................. 0608863.7
Nov. 10, 2006 (GB) .................................. 0622416.6

(51) Int. Cl.
*B62D 25/08* (2006.01)
(52) U.S. Cl. ..................................... 296/193.09; 296/30
(58) Field of Classification Search ............... 296/29, 296/30, 187.09, 187.1, 193.09, 193.1, 193.11
See application file for complete search history.

(56) References Cited

U.S. PATENT DOCUMENTS

| 7,048,326 | B2 | 5/2006 | Yasui | |
|---|---|---|---|---|
| 7,338,191 | B2 | 3/2008 | Konno et al. | |
| 2002/0033617 | A1* | 3/2002 | Blank | 296/187 |
| 2005/0077755 | A1* | 4/2005 | Yasui | 296/203.02 |
| 2006/0008615 | A1* | 1/2006 | Muteau et al. | 428/116 |

FOREIGN PATENT DOCUMENTS

| CN | 1572637 | 2/2005 |
|---|---|---|
| JP | 56-154274 U | 11/1981 |
| JP | 2005-14665 A | 1/2005 |
| JP | 2005-112171 A | 4/2005 |
| JP | 2008-254654 A | 10/2008 |

* cited by examiner

Primary Examiner — Joseph Pape
(74) Attorney, Agent, or Firm — Foley & Lardner LLP

(57) ABSTRACT

An insert for reducing deflection of a vehicle fender or wing panel includes an attachment member for attachment to a lamp cluster or lamp housing of a vehicle and a head for lying between the panel and the cluster or housing.

24 Claims, 6 Drawing Sheets

RIGIDITY OF VEHICLE BODY PANELS

BACKGROUND OF THE INVENTION

1. Field of the Invention

This invention relates to improving the rigidity of vehicle body panels, particularly fender or wing panels where they abut lamp clusters at the front or rear of a car or other vehicle.

2. Description of the Related Art

Perceived quality is a crucial aspect of customer satisfaction. In the vehicle industry, a major factor in perceived quality is the rigidity of body panels. Customers are dissatisfied with body panels that deflect too readily under applied pressure, for example when washing their car.

Whilst vehicle body panels can be thickened or made of more rigid materials to address this problem, this solution is impractical as it adds needlessly to cost and weight. This applies especially where the panel, or a particularly deflection-prone part of the panel, has no load-bearing function. The alternative of shaping the panel for stiffness is not usually an option because it compromises styling freedom.

The problem of excessive panel deflection is particularly acute where fender or wing panels abut lamp clusters at the front or rear of a vehicle. Here, the flexibility of the panel contrasts very noticeably with the rigid—and rigidly-mounted—lamp clusters. Indeed, when the edge of the panel is pushed in against its resilience, the abutting edge of the lamp cluster provides a datum against which the extent of panel deflection can be judged.

Typically, fender or wing panels define an abutting edge that is shaped to fit closely against an abutting part of a lamp cluster without excessive gaps. More specifically, a leading edge of a front fender or wing panel abuts a headlamp cluster, and a trailing edge of a rear fender or wing panel abuts a rear lamp cluster. That abutting edge is generally upright, although rarely either straight or vertical.

The central region of the abutting edge is typically unsupported and less stiff than near its upper and lower ends which may be supported, of thicker material and of stiffer shape. The central region of the abutting edge is therefore particularly vulnerable to excessive panel deflection.

With the increasing popularity of tall cars such as off-roaders, lamp clusters have tended to become taller. It follows that the abutting edge of an adjacent fender or wing panel becomes longer, which increases the problem of excessive panel deflection at the central region of that edge.

Locally stiffening the fender or wing panel to alleviate the problem of excessive panel deflection is difficult without compromising the manufacture or maintenance of a vehicle, especially operations involving the installation, assembly, removal and replacement of lamp clusters or panels. There is a need for a low-cost, simple-to-implement solution to this problem, which does not adversely affect either the manufacture or maintenance of a vehicle.

BRIEF SUMMARY OF THE INVENTION

Against this background, in one aspect, the present invention resides in an insert for reducing deflection of a vehicle fender or wing panel, the insert comprising a head for lying between the panel and a lamp cluster (for example headlamp, rear combination lamp and fog lamp) or lamp housing of the vehicle.

Preferably, the insert of the invention further comprises an attachment member for attachment of the insert to the cluster or housing. The attachment member suitably includes a formation for inter-engagement with a complementary formation of the cluster or housing. The complementary formation of the cluster or housing may be on a bracket attached to or integral with the cluster or housing.

The insert of the invention is suitably adapted to effect attachment upon insertion behind the vehicle fender or wing panel. For example, the head may be wedge-shaped and may taper in the direction of insertion.

The invention encompasses a vehicle fitted with the insert of the invention. Preferably, the insert is positioned between a lamp cluster and an overlying part of a fender or wing panel, for example with the head of the insert positioned between a recessed edge portion of a lamp lens and the overlying part of the fender or wing panel. The attachment member of the insert may be attached to a lamp housing such that the head extends over an edge portion of the lamp cluster or lens.

The invention extends to a method of manufacturing a vehicle, comprising positioning the insert between a lamp cluster or lamp housing and an overlying part of a fender or wing panel. Preferably, the insert is positioned after the lamp cluster or lamp housing and the fender or wing panel have been assembled to the vehicle.

When positioning the insert after assembly of the lamp cluster or lamp housing and the fender or wing panel it may be quite difficult to visualise the exact position of the insert, because the head and/or attachment member is shielded by the fender or wing panel and the lamp cluster or lamp housing. Therefore, it is advantageous that the insert is provided with a means of confirming that the insert has been positioned correctly. A snap-fit formation that clicks into place may provide an audible signal representing correct positioning.

The invention also extends to a lamp cluster or housing that has been adapted to attach to an insert according to the invention, as well as to an attachment member that is adapted to attach to an insert of the invention.

BRIEF DESCRIPTION OF THE SEVERAL VIEWS OF THE DRAWING

In order that the invention can be more readily understood, reference will now be made, by way of example, to the accompanying drawings in which.

DETAILED DESCRIPTION OF THE INVENTION

Figure 1:
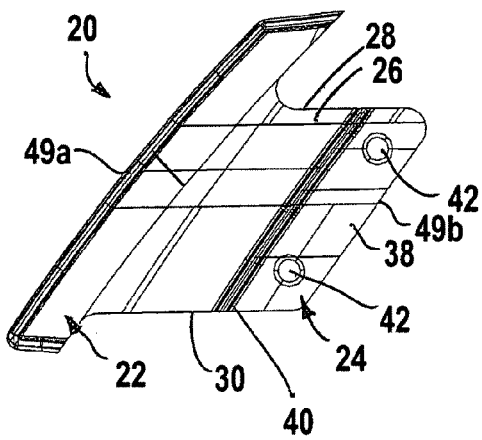
FIG. 1 is a side view of an insert in accordance with an embodiment of the invention.
Figure 2:
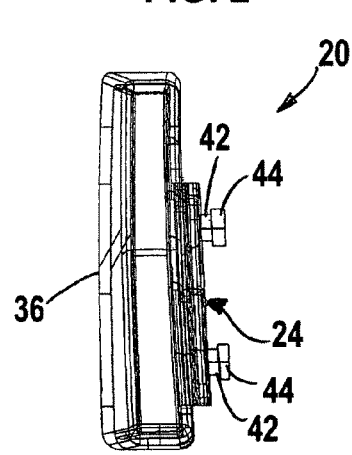
FIG. 2 is a rear view of the insert of FIG. 1.
Figure 3:
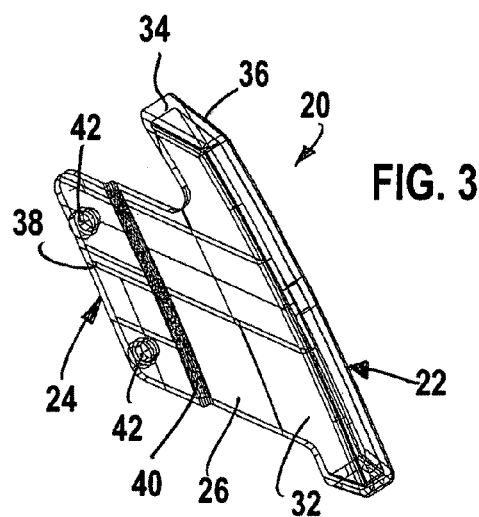
FIG. 3 is an isometric front view of the insert of FIG. 1.
Figure 4:
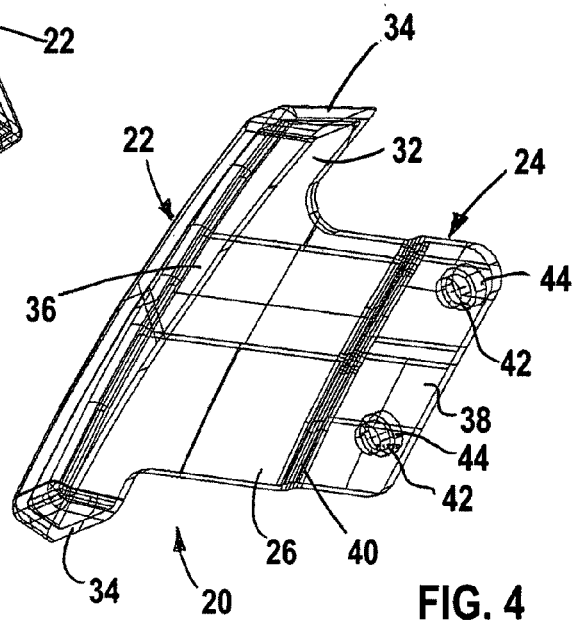
FIG. 4 is an isometric rear view of the insert of FIG. 1.

Hereinafter, description will be made of embodiments of the present invention with reference to the drawings.

Referring firstly to FIGS. 1 to 4 of the drawings, an insert 20 in accordance with the invention is an injection moulding of plastics material. The insert 20 has an enlarged head 22 at a distal end, an attachment member 24 at a proximal end, and a stem 26 connecting the head 22 and the attachment member 24.

The stem 26 is generally flat and has side edges 28, 30 that are parallel with each other and with an insertion direction in use. The head 22 and the attachment member 24 lie in, or generally parallel to, the plane of the stem 26 but are slanted with respect to the side edges 28, 30 such that the insert 20 has a skewed T-shape.

A base wall 32 of the head 22 is co-planar with the stem 26. A peripheral wall 34 upstanding from the base wall 32 extends around three sides of the head 22 including its distal end. The peripheral wall 34 supports a flat upper wall 36 spaced from the base wall 32 such that the head 22 is hollow and open toward the proximal end of the insert 20. The upper wall 36 is inclined relative to the base wall 32, its plane converging with that of the base wall 32 toward the distal end of the insert 20. In use, this tapered shape enables the insert 20 to function as a wedge as will be explained.

The attachment member 24 comprises a flat tab 38 defining the proximal end of the insert 20. The tab 38 lies in a plane offset from and parallel to the plane of the stem 26, with a slanted step 40 defining the junction between the stem 26 and the tab 38. With respect to the plane of the stem 26, the plane of the tab 38 lies on the opposite side to the peripheral wall 34 and the upper wall 36 of the head 22.

The attachment member 24 further comprises a pair of pins 42 that project away from the tab 38 on its side opposed to the peripheral wall 34 and the upper wall 36 of the head 22. The pins 42 have enlarged ends 44 for secure attachment to a bracket of a lamp housing in use, as will be explained.

Figure 5:
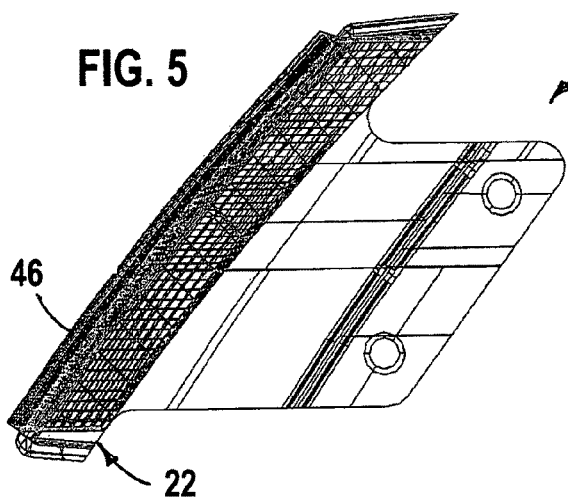
FIG. 5 is a side view of a variant of the insert of FIG. 1.
Figure 6:
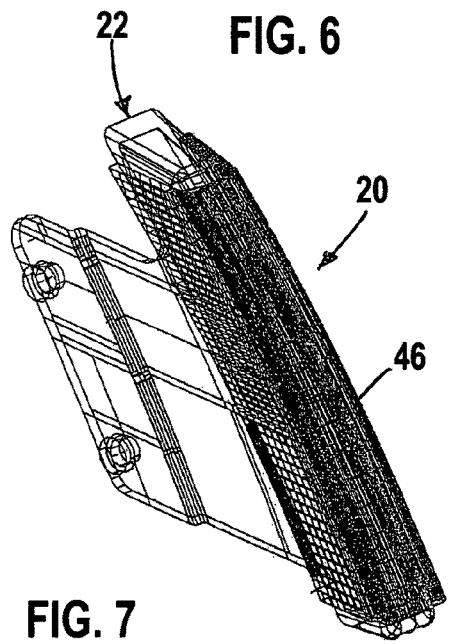
FIG. 6 is an isometric front view corresponding to FIG. 5.

FIGS. 5 and 6 show a variant of the invention in the form of an insert 20 whose head 22 carries a resilient layer 46. The resilient layer 46 is applied to the outside of the peripheral wall 34 at the distal end and over the upper wall 36 of the head 22. The layer 46 may, for example, be of foam rubber of 3 mm thickness, although this is not essential.

Figure 7:
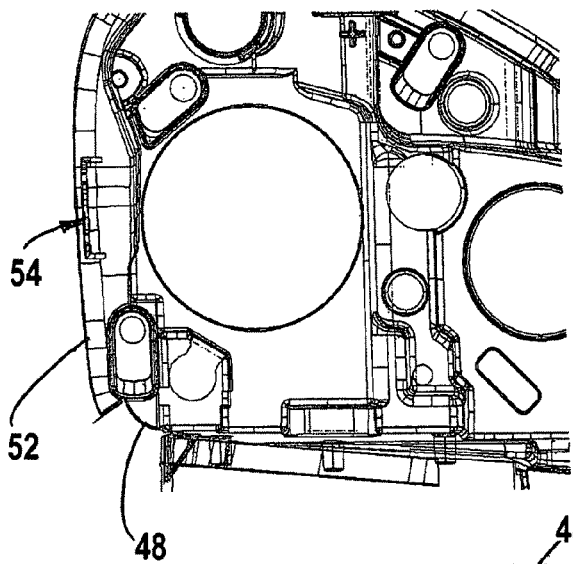
FIG. 7 is a rear view of a headlamp housing having a bracket for engagement with the insert of the embodiment of the invention.
Figure 8:
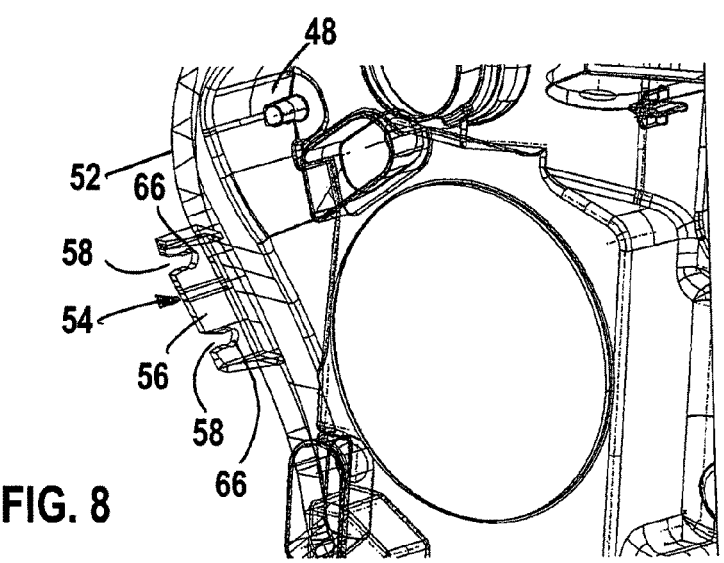
FIG. 8 is an isometric rear view corresponding to FIG. 7, taken from an inner side.
Figure 9:
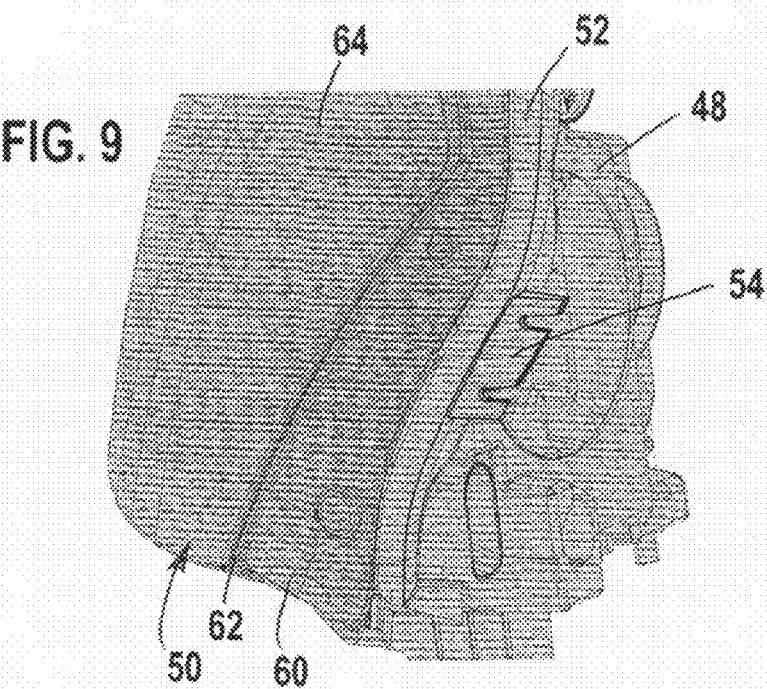
FIG. 9 is an isometric rear view corresponding to FIG. 8 but taken from an outer side and also showing a headlamp lens attached to the headlamp housing.

Moving on now to FIGS. 7, 8 and 9, these show a headlamp housing 48 adapted for use with the insert 20 of the invention, with FIG. 9 further showing the lens 50 of a headlamp fitted to the housing 48. It will be noted that the housing 48 has a peripheral shoulder 52, to which a rearwardly-facing bracket 54 is attached or with which the bracket 54 is integrally formed. The bracket 54 is shaped to engage with the attachment member 24 of the insert.

The bracket 54 has a slanting wall 56 shaped generally as a parallelogram. The wall 56 is interrupted by two slots 58 spaced to correspond to the spacing between the pins 42 of the insert 20. The slots 58 are open to the rear and extend generally horizontally when the housing 48 is mounted for use.

FIG. 9 shows how the lens 50 has a recessed edge portion 60 forward of the shoulder 52 of the housing 48, against which the shoulder 52 abuts. The recessed edge portion 60 terminates forwardly in a step 62 that leads to the visible external surface 64 of the lens 50. The abutting edge of a vehicle fender or wing panel will abut the step 62 while overlying the recessed edge portion 60 of the lens 50. This gives a substantially flush finish between the fender or wing panel and the visible external surface 64 of the lens 50. It is here that the effects of excessive panel deflection are at their most obvious and hence most damaging to perceived quality.

Figure 10:
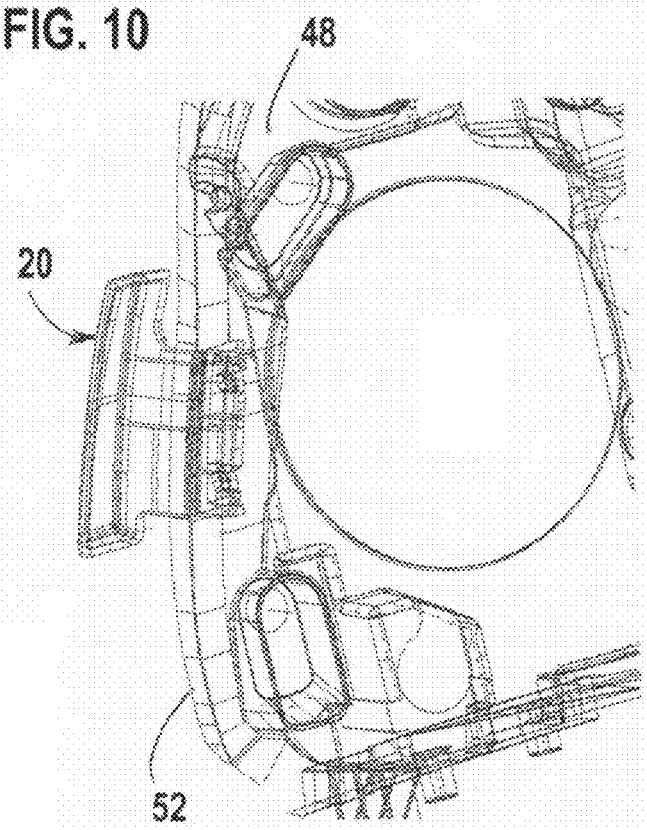
FIG. 10 is an isometric rear view of the insert of the invention attached to the headlamp housing of FIG. 7.
Figure 11:
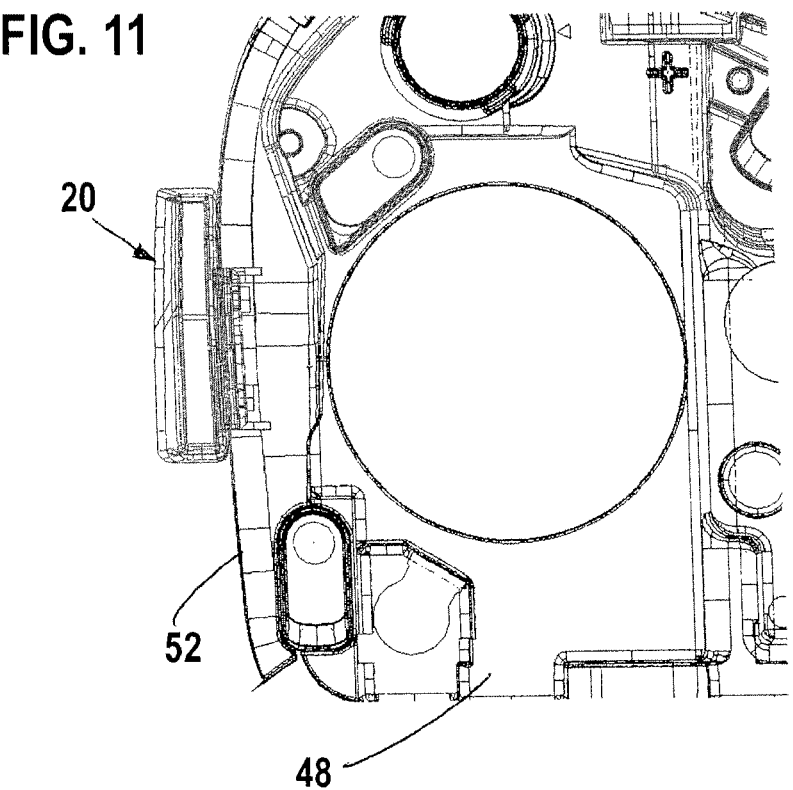
FIG. 11 is a rear view corresponding to FIG. 10.
Figure 12:
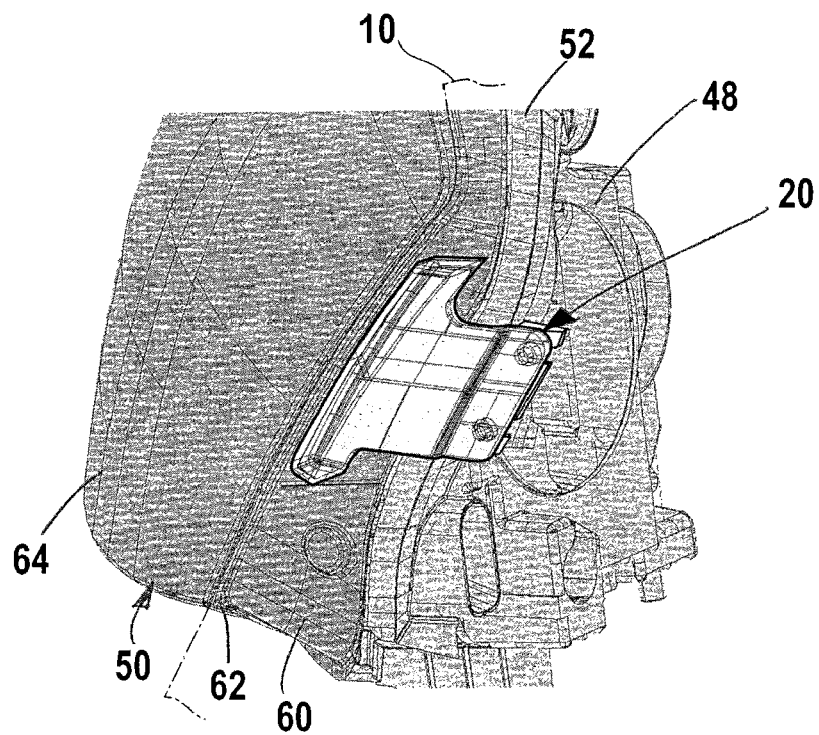
FIG. 12 is an isometric rear view corresponding to FIG. 9 but showing the insert of the invention attached to the headlamp housing and overlying an edge of the headlamp lens.
Figure 13:
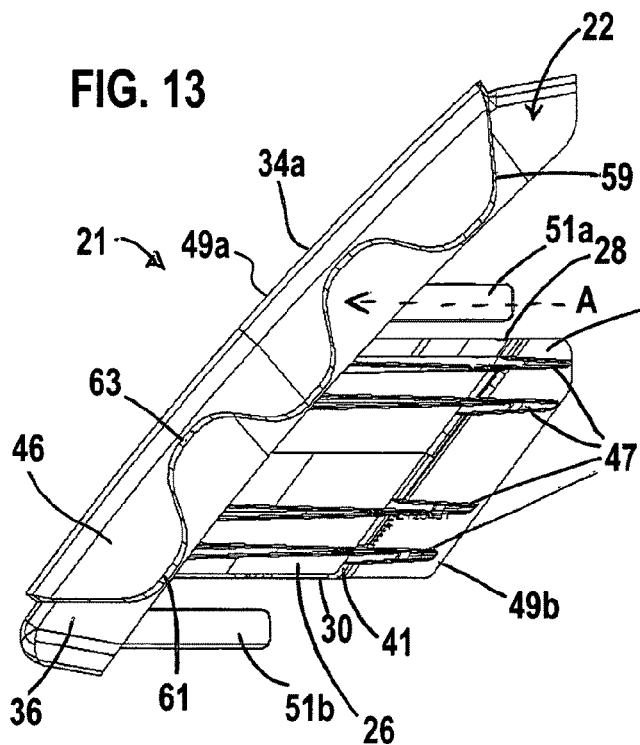
FIG. 13 is a side view of a second variant of the insert of FIG. 1.
Figure 14:
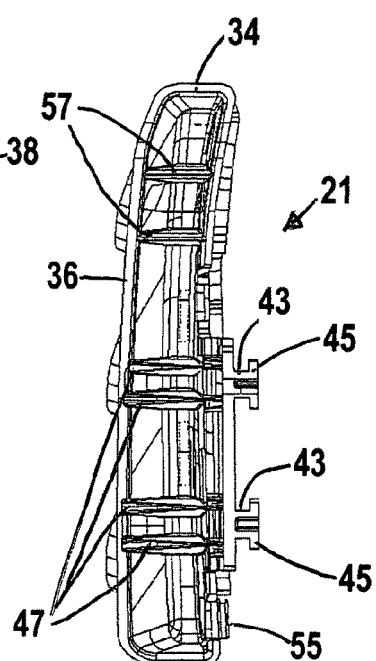
FIG. 14 is a rear view of the insert of FIG. 13.
Figure 15:
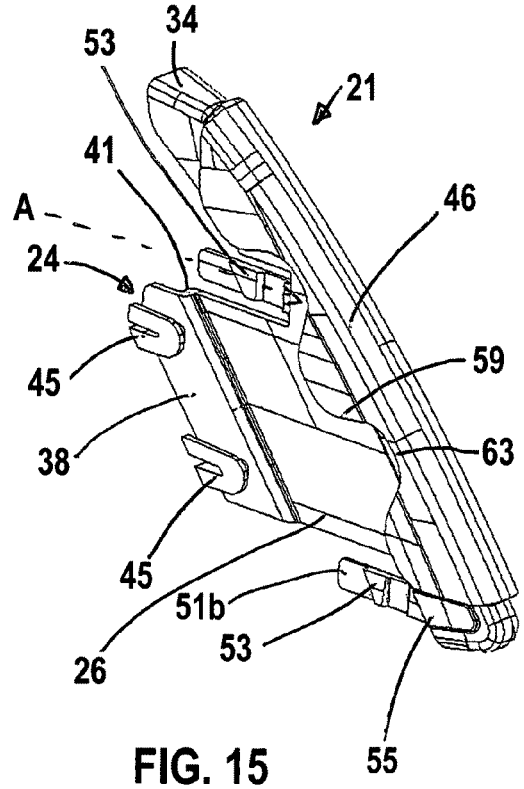
FIG. 15 is an isometric front view of the insert of FIG. 13.
Figure 16:
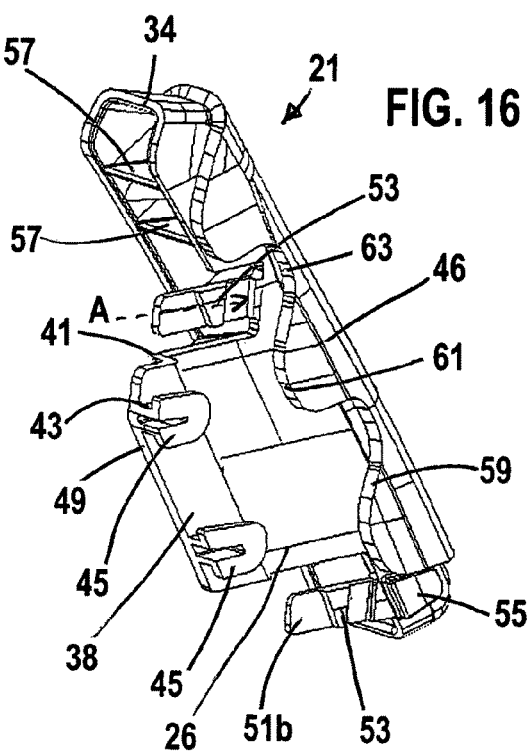
FIG. 16 is an isometric rear view of the insert of FIG. 13.

Turning finally to FIGS. 10, 11 and 12, these show how the insert 20 of FIGS. 1 to 6 attaches to and interacts with the headlamp housing 48 of FIGS. 7 to 9.

The two slots 58 that interrupt the wall 56 of the bracket 54 accept the pins 42 of the insert 20, whereupon the insert 20 is moved forwardly and generally horizontally until the pins 42 engage resiliently in the enlarged ends 66 of the slots 58. The enlarged ends 66 of the slots 58 are best appreciated in FIG. 8. The wall 56 of the bracket 54 engages under the enlarged ends 44 of the pins 42.

When the insert 20 is thus attached to the bracket 54, the head 22 of the insert 20 extends forward from the shoulder 52 of the headlamp housing 48 where, as best shown in FIG. 12, it overlies the recessed edge portion 60 of the lens 50 with the slanted head terminating just short of, and generally parallel to, the correspondingly slanted step 62 that delineates the recessed edge portion 60. Here, the head 22 of the insert 20 is positioned ideally to lie under the leading edge of a fender or wing panel 10 (shown in phantom lines in FIG. 12) and thereby to block excessive deflection of that panel when pressed at that location. The optional resilient layer 46 shown in FIGS. 5 and 6 cushions contact between the fender or wing panel and the insert 20.

FIGS. 13 to 16 show a second variant of the invention in the form of an insert 21. Like numerals are used for like parts in the description of insert 21 that follows. As before, the insert 21 has an enlarged head 22 at a distal end, an attachment member 24 at a proximal end, and a stem 26 connecting the head 22 and the attachment member 24. The head 22 has a peripheral wall 34 and an upper wall 36 akin to those of the first variant.

The attachment member 24 comprises a flat tab 38 defining the proximal end of the insert 21. The tab 38 lies in a plane offset from and parallel to the plane of the stem 26, with a step 41 defining the junction between the stem 26 and the tab 38. The attachment member 24 further comprises a pair of V-shaped projections 43 that project away from the tab 38 on its side opposed to the peripheral wall 34 and the upper wall 36 of the head 22. The projections 43 have enlarged flattened ends 45 for secure attachment to a bracket of a lamp housing in use, as will be explained. External side surfaces of the projections 43 converge distally toward the head 22.

As before, the stem 26 is generally flat and has side edges 28, 30 that are parallel with each other and with the direction of insertion in use. Lying parallel to the side edges 28, 30 on the side of the stem 26 facing the upper wall 36 of the head 22 are a series of four upstanding ribs 47 arranged in pairs towards the side edges 28, 30 of the stem 26. The ribs 47 extend from the proximal end of the tab 38 along the length of the stem 26 and into the head 22. Within the hollow head 22 the ribs extend orthogonally from the surface of the base wall 32 that faces the upper wall 36 to the facing lower surface of the upper wall 36, thus reinforcing the upper wall 36. The ribs 47 taper towards the proximal edge 49 of the tab 38. For increased rigidity, in the embodiment depicted, the portion of each rib 47 that lies across the tab 38 is slightly thicker than the portion of the corresponding rib that lies across the stem 26.

To further support the upper wall 36 of the head 22 in a spaced-apart relationship with the base wall 32, a pair of internal walls 57 extend orthogonally within the head 22, from the surface of the base wall 32 that faces the upper wall 36 to the facing surface of the upper wall 36. The internal walls 57 lie approximately parallel to the ribs 47.

The insert 21 further comprises a pair of blades 51a, 51b that extend proximally from the base wall 32 of the head 22 parallel to and spaced outwardly from the side edges 28, 30 of the stem 26. The surface of each of the blades 51a, 51b opposed to the upper wall 36 has a trapezoid-shaped raised plateau 53 for snap-fit engagement with a corresponding feature on the bracket 54, as will be explained below. The plane of the blades 51a, 51b lies approximately parallel to the plane of the stem 26, and slightly towards the upper wall 36 of the insert 21, such that the plane of the raised plateaus 53 is approximately in line with the plane of the stem 26.

The external surface of the base wall 32 opposed to the upper wall 36 has a ramp 55 positioned approximately in line with the lower blade 51b. The ramp 55 rises from the distal end of the head 22 towards the proximal side of the head 22. In use, the ramp 55 helps to space apart the base wall 32 of the head 22 and the edge portion 60 of the lens 50, as will be explained.

In addition, the head 22 of the insert 21 carries a resilient layer 46 of a foam rubber material. The resilient layer 46 is applied to the outside of the peripheral wall 34 at the distal end and over the upper wall 36 and the base wall 32 of the head 22. The edge 59 of the resilient layer 46 is shaped or cut into a wave-like form (e.g. a sinusoidal wave) having a series of peaks 61 and troughs 63. The wave-like profile of the edge 59 serves two purposes. First, it helps to avoid wrinkles forming in the resilient layer 46 when it is applied to the slightly curved distal peripheral wall 34a of the head 22. Secondly, the reduced surface area of contact between the resilient layer 46 and either the lamp cluster/lamp housing or the fender/wing panel reduces water ingress between the lamp cluster or lamp housing and the fender or wing panel by reducing capillary action. Advantageously, as in the embodiment shown, the blade 51a attaches to the base wall 32 in line with a trough 63 in the resilient layer 46 (as shown by arrow A).

Figure 17:
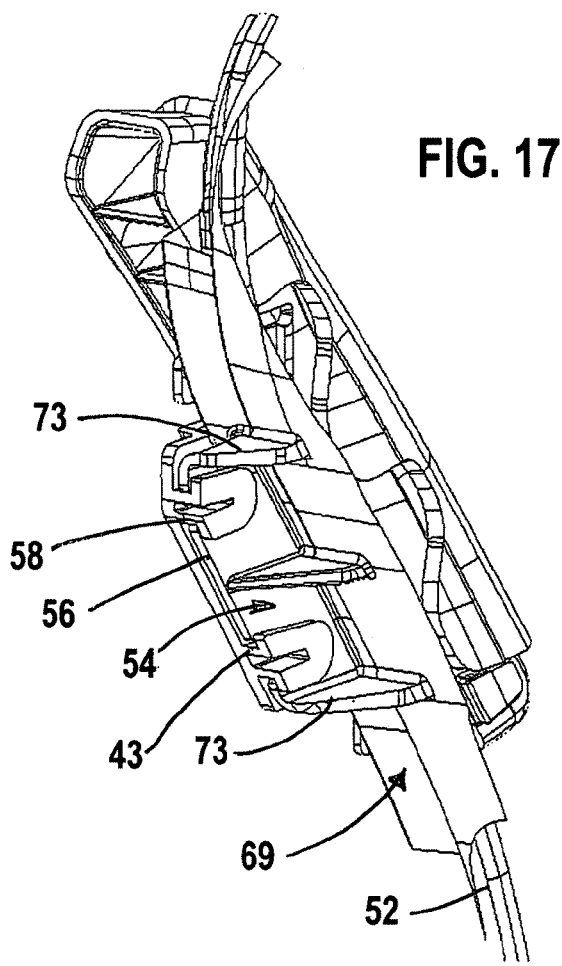
FIG. 17 is an isometric rear view of the insert of FIG. 13 attached to a headlamp housing having a bracket for engagement with the insert.
Figure 18:
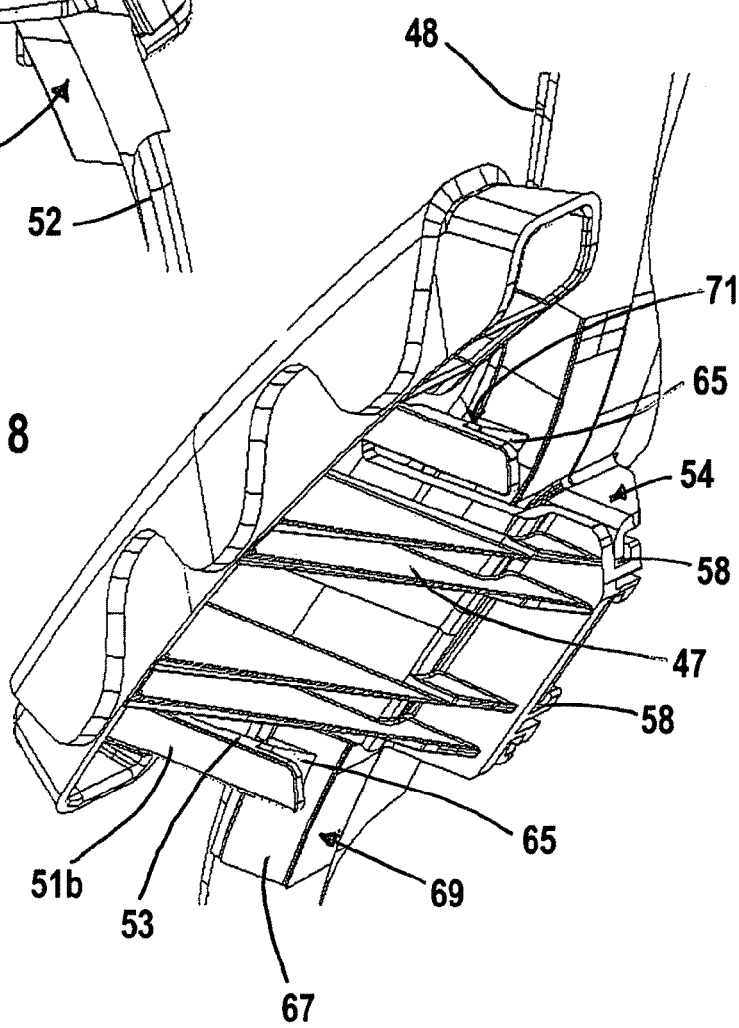
FIG. 18 is an isometric side view corresponding to FIG. 17.

FIGS. 17 and 18 show how the insert 21 of FIGS. 13 to 16 attaches to a headlamp housing 48.

As before, a rearwardly-facing bracket 54 is attached to (or integrally formed with) a peripheral shoulder 52 of the housing 48. This variant of the bracket 54 is attached to the peripheral shoulder 52 of the housing via a frame 69, which has an outwards-facing side-wall 67. The proximally-extending wall 56 of the bracket 54 is provided with two distally-tapering slots 58 that are spaced to correspond to the spacing of the V-shaped projections 43 of the insert 21 and are shaped to match the convergence of the side walls of the projections 43.

The side wall 67 of the frame 69 is provided with two wedges 65 that project outwards away from the housing 48, and which are spaced to correspond to the spacing of the blades 51a, 51b of the insert 21. The wedges 65 have a sloping proximal face that ends at a distal lip 71. In the variant depicted, the bracket 54 has webs 73 that extend between the proximally-extending wall 56 of the bracket 54 and the frame 69 so as to increase rigidity.

To attach the insert 21 to the bracket 54 and hence to the headlamp housing 48, the V-shaped projections 43 are aligned with the slots 58 and the insert 21 is moved distally and generally horizontally until the V-shaped projections 43 wedge tightly into the slots 58.

As the insert 21 is slid onto the bracket 54, the head 22 of the insert 21 slides first over the side wall 67 of the bracket 54 and then past the shoulder 52 of the headlamp housing 48. Similarly, the blades 51a, 51b and their corresponding raised plateaus 53 slide over wedges 65 that project from the side wall 67. The blades 51a, 51b are resiliently flexible to deflect as the plateaus 53 rise over the sloping proximal faces of the wedges 65.

The insert 21 and bracket 54 are co-designed such that when the V-shaped projections 43 engage fully with the slots 58, the rearwards edges of the raised plateaus 53 pass over the distal lips 71 of the wedges 65. At this point the blades 51a, 51b straighten resiliently and the plateaus 53 snap into place against the lips 71.

The snap-fit engagement of the plateaus 53 on the blades 51a, 51b against the lips 71 of the wedges 65 serves to lock the insert 21 into its correct position. The resulting click may be both heard and felt by an assembly worker to confirm correct assembly of the insert 21 on the bracket 54.

On insertion, the ramp 55 on the base wall 32 of the head 22 of the insert 21 rides over the outer surface of the recessed edge portion 60 of the lens 50. Once the insert 21 is in position, the ramp 55 provides a small surface area of contact between the insert 21 and the lens 50. This reduces the possibility of damage and wear to an anti-scratch coating of the lens 50 that may be caused by fitting the insert 21 and by rubbing of the insert 21 against the lens 50 in use of the vehicle. The resilient layer 46 also helps to achieve this objective.

During vehicle assembly, the headlamp housing 48 may be mounted to a vehicle before or, more commonly, after the adjacent wing or fender panel is attached. The insert 20 can be attached to the bracket 54 of the headlamp housing 48 at any stage in that process and even after both the headlamp housing 48 and the wing or fender panel are in place. The simple, generally horizontal movement of the insert 20 that is necessary to achieve engagement with the bracket 54 makes installation straightforward, for example by a worker reaching behind the wing or fender panel through a wheel arch of the vehicle. When inserted in this manner, the wedge-shaped head 22 of the insert 20 eases positioning of the insert in the gap between the recessed edge portion 60 of the lens 50 and the overlying fender or wing panel.

Many variations are possible within the inventive concept. For example whilst the head is preferably hollow to reduce material cost, it could be solid. Also, the insert could be die-cast of metal or otherwise fabricated.

Whilst the attachment member of the illustrated embodiment employs inter-engaging formations, it is possible for the attachment member to employ other attachment techniques such as mechanical fastenings or adhesives.

Accordingly, when assessing the scope of the invention, reference should be made to the accompanying claims rather than to the specific embodiments described above. With respect to the above embodiment, the bracket 54 and the frame 69 correspond to a complementary formation, the plateau 53 and the wedge 65 correspond to first and second components of a snap-fit formation, the internal wall 57 corresponds to a strengthening wall, the resilient layer 46 corresponds to a resilient outer layer, the ramp 55 corresponds to a raised section on an outer surface of a head, and the rib 47 corresponds to a strengthening rib.

The entire contents of a United Kingdom patent application No. 0608863.7 with a filing date of May 5, 2006 and a United Kingdom patent application No. 0622416.6 with a filing date of Nov. 10, 2006 are herein incorporated by reference.

What is claimed is:
1. A vehicle comprising:
an insert for reducing deflection of one of a vehicle fender and a wing panel, the insert comprising:

a head for lying between the one of the vehicle fender and the wing panel and one of a lamp cluster and a lamp housing of the vehicle; and an attachment member for attaching the insert to the one of the lamp cluster and the lamp housing, wherein the attachment member includes a formation for inter-engagement with a complementary formation of the one of the lamp cluster and the lamp housing, wherein the attachment member includes at least one snap-fit formation, a first component of the snap-fit formation being provided on the insert and a second component of the snap-fit formation being provided on the complementary formation, and wherein the insert is positioned between the one of the lamp cluster and the lamp housing and an overlying part of the one of the vehicle fender and the wing panel.

2. The vehicle of claim 1, wherein the complementary formation of the one of the lamp cluster and the lamp housing is on a bracket attached to or integral with the one of the lamp cluster and the lamp housing.

3. The vehicle of claim 1, wherein the first component of the snap-fit formation comprises a raised plateau and the second component of the snap-fit formation comprises a complementary wedge, and wherein, in use, the raised plateau is capable of inter-engaging with the wedge.

4. The vehicle of claim 3, wherein the head is wedge-shaped and tapers in a direction of insertion.

5. The vehicle of claim 1, wherein the first component of the snap-fit formation is formed on at least one resilient blade extending proximally from the head.

6. The vehicle of claim 1, wherein the insert is configured to effect attachment upon insertion behind the one of the vehicle fender and the wing panel.

7. The vehicle of claim 1, wherein an outer surface of the head has a raised section that, in use, reduces a surface area of contact between the head and the one of the lamp cluster and the lamp housing of the vehicle.

8. The vehicle of claim 7, wherein the raised section is a ramp.

9. The vehicle of claim 1, further comprising at least one strengthening rib projecting orthogonally from a surface of the insert.

10. The vehicle of claim 1, wherein the head of the insert is positioned between a recessed edge portion of a lamp lens and the overlying part of the one of the vehicle fender and the wing panel.

11. The vehicle of claim 1, wherein the attachment member of the insert is attached to the lamp housing and the head extends over an edge portion of one of the lamp cluster and a lamp lens.

12. A vehicle comprising:
an insert for reducing deflection of one of a vehicle fender and a wing panel, the insert comprising:
a head for lying between the one of the vehicle fender and the wing panel and one of a lamp cluster and a lamp housing of the vehicle,
wherein the head is hollow, and
wherein the insert is positioned between the one of the lamp cluster and the lamp housing and an overlying part of the one of the vehicle fender and the wing panel.

13. The vehicle of claim 12, wherein at least one strengthening wall is located inside the head.

14. The vehicle of claim 12, wherein the head of the insert is positioned between a recessed edge portion of a lamp lens and the overlying part of the one of the vehicle fender and the wing panel.

15. A vehicle comprising:
an insert for reducing deflection of one of a vehicle fender and a wing panel, the insert comprising:
a head for lying between the one of the vehicle fender and the wing panel and one of a lamp cluster and a lamp housing of the vehicle,
wherein the head has a resilient outer layer, and
wherein the insert is positioned between the one of the lamp cluster and the lamp housing and an overlying part of the one of the vehicle fender and the wing panel.

16. The vehicle of claim 15 wherein at least a portion of an edge of the resilient outer layer has a sinusoidal wave-shape.

17. The vehicle of claim 15, wherein the head of the insert is positioned between a recessed edge portion of a lamp lens and the overlying part of the one of the vehicle fender and the wing panel.

18. A method for manufacturing a vehicle comprising:
providing an insert for reducing deflection of one of a vehicle fender and a wing panel, the insert comprising: a head for lying between the one of the vehicle fender and the wing panel and one of a lamp cluster and a lamp housing of the vehicle; and an attachment member for attaching the insert to the one of the lamp cluster and the lamp housing, wherein the attachment member includes a formation for inter-engagement with a complementary formation of the one of the lamp cluster and the lamp housing, and wherein the attachment member includes at least one snap-fit formation, a first component of the snap-fit formation being provided on the insert and a second component of the snap-fit formation being provided on the complementary formation; and
positioning the head of the insert between the one of the lamp cluster and the lamp housing and an overlying part of the one of the vehicle fender and the wing panel of the vehicle.

19. The method of claim 18, further comprising positioning the insert after the one of the lamp cluster and the lamp housing and the one of the vehicle fender and the wing panel have been assembled to the vehicle.

20. The method of claim 18, wherein the head of the insert is positioned between a recessed edge portion of a lamp lens and the overlying part of the one of the vehicle fender and the wing panel.

21. A vehicle comprising:
an insert for reducing deflection of one of a vehicle fender and a wing panel, the insert comprising:
a head for lying between the one of the vehicle fender and the wing panel and one of a lamp cluster and a lamp housing of the vehicle; and
an attachment member for attaching the insert to the one of the lamp cluster and the lamp housing,
wherein the attachment member includes a formation for inter-engagement with a complementary formation of the one of the lamp cluster and the lamp housing,
wherein the head is positioned to reduce excessive deflection of the one of the vehicle fender and the wing panel when pressed at a central region of the one of the vehicle fender and the wing panel, and
wherein the insert is positioned between the one of the lamp cluster and the lamp housing and an overlying part of the one of the vehicle fender and the wing panel.

22. The vehicle of claim 21, wherein the head of the insert is positioned between a recessed edge portion of a lamp lens and the overlying part of the one of the vehicle fender and the wing panel.

23. An insert for reducing deflection of one of a vehicle fender and a wing panel, the insert comprising:
- a head for lying between the one of the vehicle fender and the wing panel and one of a lamp cluster and a lamp housing of a vehicle; and
- an attachment member for attaching the insert to the one of the lamp cluster and the lamp housing,
- wherein the attachment member includes a formation for inter-engagement with a complementary formation of the one of the lamp cluster and the lamp housing,
- wherein the attachment member includes at least one snap-fit formation, a first component of the snap-fit formation being provided on the insert and a second component of the snap-fit formation being provided on the complementary formation, and
- wherein the complementary formation of the one of the lamp cluster and the lamp housing is on a bracket attached to or integral with the one of the lamp cluster and the lamp housing.

24. An insert for reducing deflection of one of a vehicle fender and a wing panel, the insert comprising:
- a head for lying between the one of the vehicle fender and the wing panel and one of a lamp cluster and a lamp housing of a vehicle; and
- an attachment member for attaching the insert to the one of the lamp cluster and the lamp housing,
- wherein the attachment member includes a formation for inter-engagement with a complementary formation of the one of the lamp cluster and the lamp housing, and
- wherein the attachment member includes at least one snap-fit formation, a first component of the snap-fit formation being provided on the insert and a second component of the snap-fit formation being provided on the complementary formation,
- wherein the first component of the snap-fit formation comprises a raised plateau and the second component of the snap-fit formation comprises a complementary wedge, and
- wherein, in use, the raised plateau is capable of inter-engaging with the wedge.

* * * * *